(12) United States Patent
Hedman et al.

(10) Patent No.: US 12,198,377 B1
(45) Date of Patent: Jan. 14, 2025

(54) POINT OF INTEREST TRACKING AND ESTIMATION

(71) Applicant: Tomahawk Robotics, Inc., Melbourne, FL (US)

(72) Inventors: Daniel R. Hedman, Palm Bay, FL (US); Matthew D. Summer, Melbourne, FL (US); William S. Bowman, Melbourne, FL (US); Michael E. Bowman, Satellite Beach, FL (US); Brad Truesdell, Indialantic, FL (US); Andrew D. Falendysz, Grant, FL (US)

(73) Assignee: Tomahawk Robotics, Inc., Melbourne, FL (US)

( * ) Notice: Subject to any disclaimer, the term of this patent is extended or adjusted under 35 U.S.C. 154(b) by 0 days.

(21) Appl. No.: 18/350,722

(22) Filed: Jul. 11, 2023

(51) Int. Cl.
| | |
|---|---|
| H04N 7/18 | (2006.01) |
| G06T 7/60 | (2017.01) |
| G06T 7/73 | (2017.01) |
| G06V 10/774 | (2022.01) |
| G06V 20/17 | (2022.01) |
| G06V 40/20 | (2022.01) |
| H04N 23/661 | (2023.01) |

(52) U.S. Cl.
CPC ............. *G06T 7/74* (2017.01); *G06T 7/60* (2013.01); *G06V 10/774* (2022.01); *G06V 20/17* (2022.01); *G06V 40/20* (2022.01); *H04N 7/185* (2013.01); *H04N 23/661* (2023.01); *G06T 2207/10032* (2013.01); *G06T 2207/20081* (2013.01)

(58) Field of Classification Search
CPC ........ H04N 7/185; H04N 7/18; H04N 23/661; G06T 7/74; G06T 2207/20081; G06T 7/60; G06T 2207/10032; G06V 20/17; G06V 10/774; G06V 40/20
USPC ......... 348/143, 144, 148; 345/419; 382/103, 382/104, 154
See application file for complete search history.

(56) References Cited

U.S. PATENT DOCUMENTS

| | | | |
|---|---|---|---|
| 10,520,943 B2 | 12/2019 | Martirosyan et al. | |
| 2016/0065903 A1* | 3/2016 | Wang | G06V 40/19 348/148 |
| 2017/0277180 A1 | 9/2017 | Baer | |
| 2020/0265607 A1 | 8/2020 | Lev | |
| 2023/0166759 A1 | 6/2023 | Yasuda | |

(Continued)

FOREIGN PATENT DOCUMENTS

CN 109712185 A 5/2019

OTHER PUBLICATIONS

International Search Report and Written Opinion mailed Oct. 22, 2024, in corresponding International Application No. PCT/US2024/037481.

*Primary Examiner* — Sherrie Hsia
(74) *Attorney, Agent, or Firm* — Perkins Coie LLP

(57) ABSTRACT

Methods and systems are described herein for determining three-dimensional locations of objects within identified portions of images. An image processing system may receive an image and an identification of location within an image. The image may be input into a machine learning model to detect one or more objects within the identified location. Multiple images may then be used to generate location estimations of those objects. Based on the location estimations, an accurate three-dimensional location may be calculated.

20 Claims, 6 Drawing Sheets

(56) References Cited

U.S. PATENT DOCUMENTS

2023/0267744 A1\* 8/2023 Iwasaki .................. G06V 40/20
348/143

\* cited by examiner

POINT OF INTEREST TRACKING AND ESTIMATION

BACKGROUND

Stable and reliable robotic systems are becoming increasingly common, which has contributed to the recent advancement and proliferation of unmanned system technologies. In many instances these systems are equipped with recording devices (e.g., video, infrared, heat, audio, point cloud, and/or other recording devices). For example, a drone equipped with a camera (e.g., a video camera, a night vision camera, an infrared camera, or another suitable camera) may enable an operator or another observer to get a good tactical view of what is happening in an operational area. In many instances, it may be useful to identify objects in the camera footage (e.g., other operators, vehicles, etc.) and indicate a position and orientation of those objects in three-dimensional space (e.g., is the object facing in a particular direction). However, it may be difficult to determine an accurate three-dimensional location of objects within the image as the camera is mounted to a vehicle (e.g., a drone) that is moving (e.g., flying) and the distance to the object may be changing as the vehicle is moving. Furthermore, it may be difficult to determine the distance to the object from the camera, which is the basis for determining a three-dimensional location of the object.

For example, an operator may be controlling a drone with a mounted camera that is hovering over an operational area. The drone may be sending a video feed of the operational area to the operator and/or to a command-and-control position. There may be multiple operators within the operational area together with multiple vehicles. It may be useful to determine a three-dimensional location of each object within the operational area. Some ways of determining a three-dimensional location may include the use of heavy and costly laser systems. Those systems may decrease operation time for the vehicle (e.g., battery drain when using and carrying the equipment). In addition, it may not be practical to equip each vehicle with such a device, especially when the vehicle may not ever return. Thus, it may be difficult to accurately determine three-dimensional locations of objects within images in a video feed without specialized heavy and costly equipment. This determination is even more difficult because the vehicle is moving and is susceptible to vibration.

SUMMARY

Therefore, methods and systems are described herein for determining three-dimensional locations of objects within images received from a camera mounted on a vehicle (e.g., an unmanned vehicle such as flying/hovering drone). For example, an image processing system may be used to perform the operations described herein. The image processing system may be hosted by the vehicle (e.g., an aerial drone), at a central location (e.g., a command-and-control point), or on a computing device being used by an operator. For example, a command-and-control point may be in a vehicle equipped with one or more computing devices, a datacenter that houses computing devices, or in another suitable environment.

The image processing system may receive (e.g., at an unmanned vehicle) an identification of a target location within an image recorded by the unmanned vehicle. The target location may be an object, an area, a group of objects or another suitable location. The image processing system may receive the identification from a command center, from an operator, or from another suitable source. For example, an operator may use an input system (e.g., a touch screen) on the operator's user device to circle an area, to touch the screen where the object is located or perform another suitable selection. The selection may indicate to the image processing system which location within the image interests the user and may store the identification.

The image processing system may then identify objects within the target location. In particular, the image processing system may input the image into a machine learning model to obtain an object identifier and an orientation of an object within the target location. The machine learning model may be trained to detect objects within received images. In some embodiments, the image processing system may provide the target location to the machine learning model and the machine learning model may output object identifiers and orientations of the corresponding objects. For example, the machine learning model may output an object identifier (e.g., tank and/or model of the tank) and orientation (e.g., gun turret/tank facing south).

The image processing system may then determine real-world dimensions of each identified object. In particular, the image processing system may determine, based on the object identifier, a set of real-world dimensions associated with the object. For example, the image processing system may use an identifier of the object to query a database and may retrieve, from the database, width, length, and height of the object (e.g., of the tank). The real-world dimensions of the object may be used to help determine distance to object from the vehicle that recorded the image.

The image processing system may then collect more images of the target location from slightly different distances or locations. Thus, the image processing system may receive, from a camera mounted on the unmanned vehicle, an image stream that includes a plurality of images with each image of the plurality of images showing the target location. As indicated above, the image stream may be recorded by the camera as the unmanned vehicle moves in relation to the object and/or the target area.

When the images are recorded, the image processing system may generate data needed to estimate a distance between the camera and the object. Thus, the image processing system may generate a plurality of sets of image metadata for the plurality of images. Each set of image metadata may include the orientation of the object, image dimensions of an object, camera data associated with the camera, an orientation of the camera and a position of the camera within three-dimensional space at a time when each image was recorded. That is, the image processing system may estimate the range from the camera to the object in its field of view by recognizing the scale of the object and using field of view data from the camera. For example, the camera may record ten images of the tank at different distances and angles to the tank and may generate metadata associated with each image (e.g., the camera's orientation when the image was recorded, position of the camera within three-dimensional space, camera data and/or other metadata). The image processing system may also determine (e.g., based on real-world dimensions of the object and orientation of the object) image dimensions of the object. For example, if a tank is facing in a certain direction, the image processing system may determine that a particular side of the object is visible, and the size of that side can be measured from the image. However, another side of the object may not be visible in view of the orientation, and the image processing system may calculate the size of that side within the image.

The image processing system may then use the metadata to determine a position estimate of the object for each image. In particular, the image processing system may determine a plurality of position estimations of the object within the three-dimensional space. For example, the image processing system may generate, for each image, an estimated distance from the camera to the object in three-dimensional space based on camera settings such as field of view and focal length, real-world object dimensions, image object dimensions, etc. The image processing system may then use the distance to object from the camera in combination with the camera's location (e.g., as determined from Global Positioning System (GPS) coordinates and/or other methods).

When the estimates are determined, the image processing system may use a combination of the estimates to calculate a more accurate location of an object in the three-dimensional space. In particular, the image processing system may determine a location of the object within the three-dimensional space based on the plurality of position estimations. That is, all the estimates separately may not be exact, but combining the estimates may lead to a much more accurate location within the three-dimensional space. In some embodiments, the image processing system may calculate an average of the latitude and the longitude for each three-dimensional estimate to arrive at the location of the object within the three-dimensional space. In addition, the image processing system may determine the altitude of the object as well, for example, for hovering objects.

In some instances, as the vehicle is moving around and recording images, the orientation of the object may change (e.g., because of the object moving or the vehicle moving). Thus, the image processing system inputs each image through the machine learning model to calculate an updated orientation of the object. In addition, if the object is moving, the image processing system may instruct the unmanned vehicle to maneuver to get more accurate estimations of three-dimensional location of the object.

Furthermore, the image processing system may not be able to determine the dimensions of an object because the object is not within the database available to the image processing system. In this case, the image processing system may identify another object with known dimensions in the vicinity of the unidentified object and calculate the unidentified object's dimensions based on the known object's dimensions.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
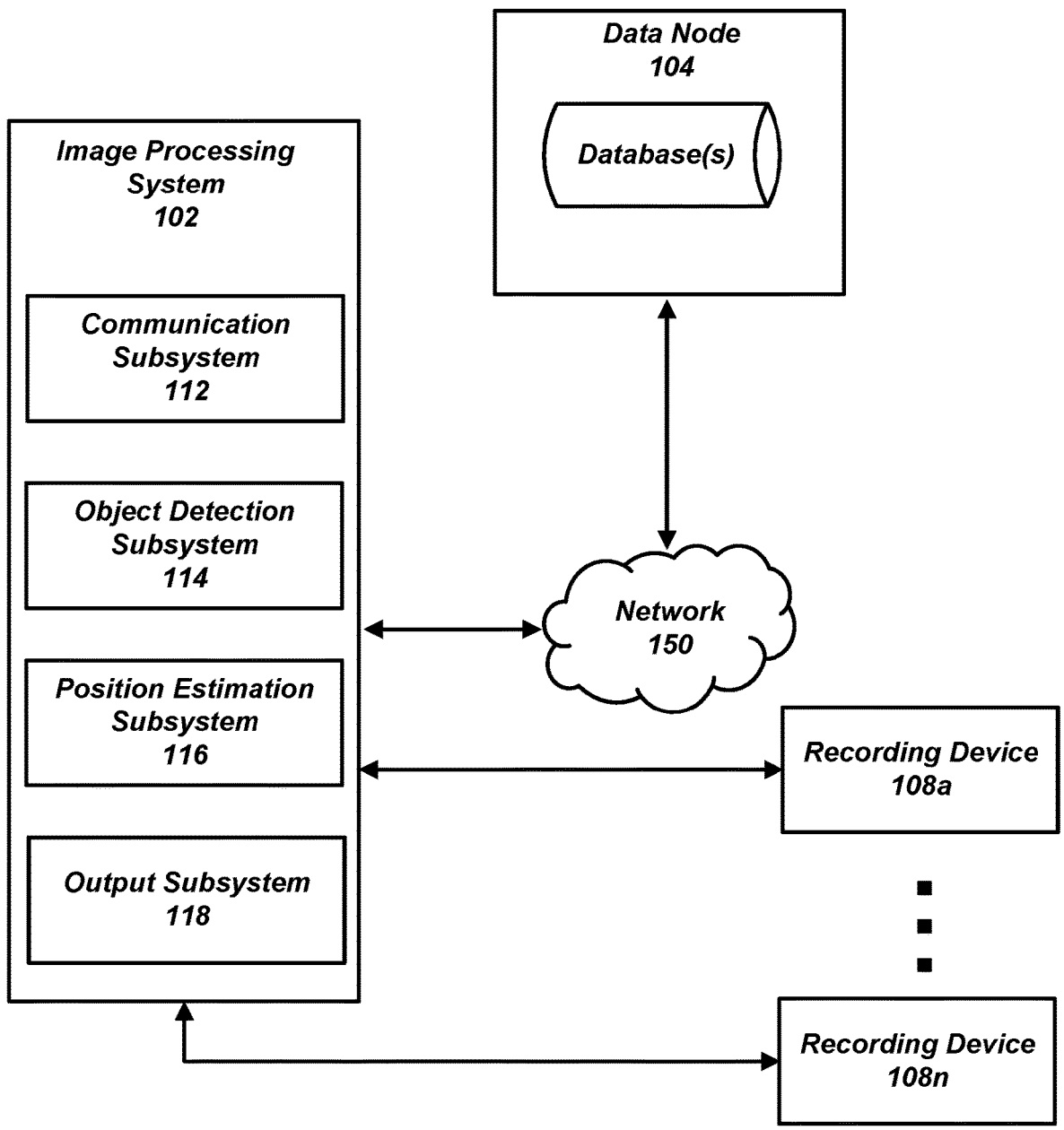
FIG. 1 shows an illustrative system for determining three-dimensional locations of objects in images, in accordance with one or more embodiments of this disclosure.

FIG. 1 is an example of environment 100 for identifying three-dimensional locations of one or more objects within a video stream. Environment 100 includes image processing system 102, data node 104, and recording devices 108a-108n. Image processing system 102 may execute instructions for identifying three-dimensional locations of one or more objects within a video stream. Image processing system 102 may include software, hardware, or a combination of the two. In some embodiments, although shown separately, image processing system 102 and data node 104 may reside on the same computing device.

Data node 104 may store various data. For example, data node 104 may store a repository of machine learning models that may be accessed by image processing system 102. In some embodiments, data node 104 may also be used to train machine learning models and/or adjust parameters (e.g., hyperparameters) associated with those machine learning models. Data node 104 may include software, hardware, or a combination of the two. For example, data node 104 may be a physical server, or a virtual server that is running on a physical computer system. In some embodiments, data node 104 may reside in a datacenter to be used by commanding officers for situational awareness. Network 150 may be a local area network, a wide area network (e.g., the Internet), or a combination of the two. Recording devices 108a-108n may be devices attached to unmanned vehicles and may include video cameras, infrared cameras, microphones, thermal imaging devices, and/or other suitable devices.

Image processing system 102 may receive an identification of a target location within an image. For example, image processing system 102 may be hosted on an unmanned vehicle (e.g., an aerial drone). Image processing system 102 may transmit an image or a video stream of images to an operator, to a command-and-control center or to another suitable target. For example, the image or images being transmitted may be part of an image stream being captured by a camera (e.g., recording device of recording devices 108a-108n) mounted onto a drone or another suitable vehicle. In some embodiments, the drone may be wirelessly connected to a network (e.g., network 150) and may be transmitting image data (e.g., footage) to the image processing system and/or to data node 104. When the image or images are received by a device (e.g., a user device, a device at a command-and-control center, or by another suitable device), the operator of the device may select a target location based on the image. For example, the operator may use a finger, a stylus or another suitable selection tool to select the location (e.g., a circle, a square, or another suitable shape). In some embodiments, the target location may be selected automatically by a computer system. Furthermore, multiple target locations may be selected and each processed based on the disclosure below.

When the target location is selected, the target location may be sent to image processing system 102 (e.g., hosted at an unmanned vehicle). In some embodiments, the image processing system may be hosted on a device at a command-and-control center and/or on an operator's device. Image processing system 102 may receive the identification of the target location using communication subsystem 112. Communication subsystem 112 may include software components, hardware components, or a combination of both. For example, communication subsystem 112 may include a network card (e.g., a wired/wireless network card/processor) that is coupled with software to drive the card/processor. The network card may be built into a server or another suitable computing device.

Figure 2:
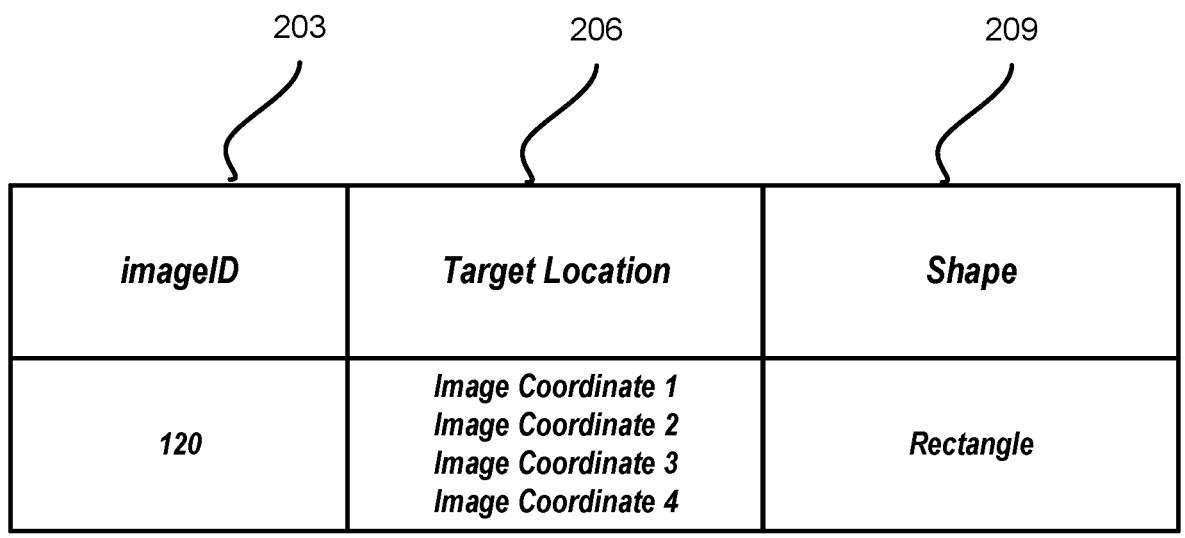
FIG. 2 illustrates an excerpt of a data structure that may store the target location and a shape of the target location, in accordance with one or more embodiments of this disclosure.

FIG. 2 illustrates an excerpt of a data structure 200 that may store the target location and a shape of the target location. Field 203 may store an image identifier that identifies an image in which the target location was selected. Field 206 may store a target location which is exemplified by a set of coordinates. Field 209 may store a shape identifier. For example, FIG. 2 illustrates a target location that has four coordinates identifying the target location with a shape being a rectangle. Thus, the coordinates may be pixel locations within an image. Another shape that may be used is a circle or an oval. For a circle, there may be a single coordinate (e.g., X-Y coordinate within the image) indicating a center of a circle with a measure of the diameter or radius indicating the size of the circle. Those measures may be in a number of pixels as units or in other suitable units. In some embodiments, image processing system 102 may use other ways to receive and store target locations. For example, if an operator uses a stylus or a finger to draw the target location, image processing system 102 may simply store coordinates of every pixel that the user touched when using the stylus or the finger. Communication subsystem 112 may pass each image and the image metadata or a pointer to an address in memory to object detection subsystem 114.

Object detection subsystem 114 may include software components, hardware components, or a combination of both. Object detection subsystem 114 may encompass a machine learning model or may be enabled to access the machine learning model. Object detection subsystem 114 may input the image into a machine learning model to obtain an object identifier and an orientation of an object within the target location. The machine learning model may be trained to detect objects within received images. In some embodiments, in addition to inputting the image into the machine learning model, object detection subsystem 114 may input the indication of the target location into the machine learning model. In some embodiments, object detection subsystem 114 may use the target location in combination with output of the machine learning model, as will be described later in this disclosure.

Figure 3:
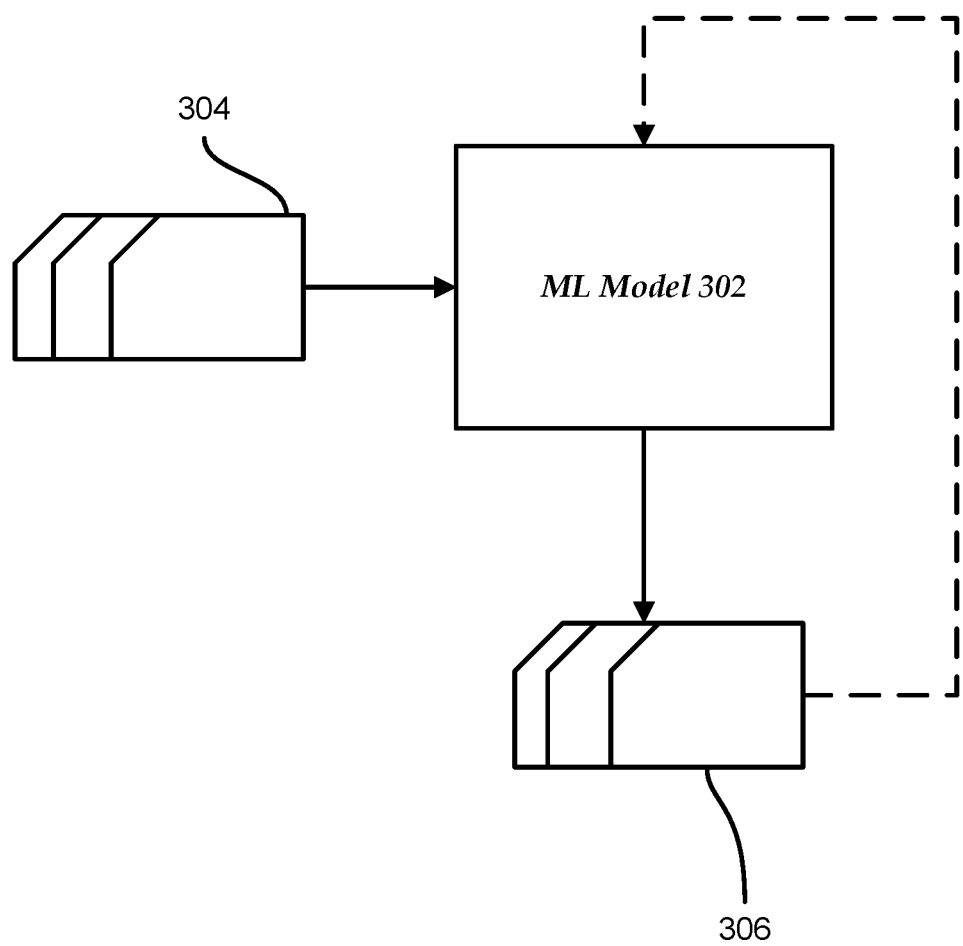
FIG. 3 illustrates an exemplary machine learning model, in accordance with one or more embodiments of this disclosure.

The machine learning model used in connection with this disclosure may take many forms. FIG. 3 illustrates an exemplary machine learning model. Machine learning model 302 may take input 304 (e.g., the image and/or target location) and may output 306 one or more object identifiers of objects within the image. In some embodiments, the machine learning model may output a probability that the object has been detected and a location within the image of the object. In some embodiments, the machine learning model may output identifiers of objects found within the target location that was input into the machine learning model. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

When object detection subsystem 114 receives output from the machine learning model, object detection subsystem 114 may determine, based on the object identifier, a set of real-world dimensions associated with the object. In some embodiments, the machine learning model may receive the image as input for detecting objects within the image. The machine learning model may output object identifiers of objects that were detected in the image. In addition, the machine learning model may output the coordinates within each image associated with each object. The coordinates may be two dimensional coordinates (e.g., X-Y coordinates) based on pixel count within the image. In one example, only one X-Y coordinate may be output (e.g., 230 by 340) indicating the center of the object or a central position. In one example, many X-Y coordinates may be output. For example, the X-Y coordinates may indicate the outline of the object. Object detection subsystem 114 may then, based on the coordinates and the target location, determine which object or objects are located within the target location.

In some embodiments, the machine learning model may receive the image and the target location as an input and may only output an object or objects within the target location. In both instances, the machine learning model may output a probability that an object has been identified correctly. Image processing system 102 may use the probability to determine whether to process the object or not to process the object. Furthermore, the machine learning model may output the orientation of the object. The orientation of the object may indicate which way the object is facing. For example, if the object identifier is a tank, the machine learning model may output which way, within the image, the turret is facing or which way the front of the tank is facing. The indicating may be a number of degrees of an angle where the top of the image indicates north, the bottom of the image may indicate south, the left of the image may indicate west, and the right of the image may indicate cast. For example, if the tank is facing the bottom left corner of the image, the indication may be forty-five degrees south-west. However, other schemas to indicate orientation may be implemented.

Thus, object detection subsystem 114 may determine, based on the object identifier, a set of real-world dimensions associated with the object. For example, the identifier of the object may be a particular type of object (e.g., tank). In another example, the identifier of the object may be a specific model of the object (e.g., M1A2 Abrams Main Battle Tank). Thus, object detection subsystem 114 may transmit, to a database server (e.g., data node 104), a request for real-world dimensions of the object. The database server may perform a lookup of the object identifier and respond with the dimensions (e.g., length, width, and/or height). Object detection subsystem 114 may store the set of real-world dimensions, for example, in memory.

Image processing system 102 may then proceed to determine the location of the object in three-dimensional space by recording images from different locations as a vehicle (e.g., an aerial drone) is moving around and estimating the three-dimensional locations from different positions to arrive at a location within three-dimensional space. In particular, object detection subsystem 114 may receive (e.g., via communication subsystem 112) an image stream that includes a plurality of images with each image of the plurality of images showing the target location. The image stream may be recorded by the camera as the unmanned vehicle moves in relation to the object. For example, if image processing system 102 is hosted on the unmanned vehicle (e.g., an aerial drone), the image processing system may receive the image stream directly from the camera (e.g., via an electronic connection). If the image processing system is not hosted on the unmanned vehicle (e.g., hosted on a device of an operator or at a command-and-control center), the image processing system may receive the images wirelessly from the unmanned vehicle. The images may include camera settings that were used to record the images (e.g., focal length and/or other suitable settings).

Object detection subsystem 114 may pass the image stream and the camera settings to position estimation subsystem 116. Position estimation subsystem 116 may include software components, hardware components, or a combination of both. For example, position estimation subsystem 116 may include software components that access data in memory and/or storage, and may use one or more processors to perform its operations. Position estimation subsystem 116 may generate a plurality of sets of image metadata for the plurality of images. Each set of image metadata may include one or more of the following: the orientation of the object, image dimensions of the object, camera data associated with the camera (e.g., focal length, field of view and/or other data), an orientation of the camera mounted onto the unmanned vehicle and a position of the camera mounted onto the unmanned vehicle within three-dimensional space at a time when each image was recorded. Position estimation subsystem 116 may determine the orientation of the camera by querying payload data (e.g., data associated with the gimbal used for mounting the camera). Furthermore, position estimation subsystem 116 may determine the position of the camera based on the position of the unmanned vehicle. For example, position estimation subsystem 116 may query the navigation system of the unmanned vehicle for the position.

In some embodiments, the orientation of the camera may be referred to as an angular position of the camera. The angular position of the camera may be expressed in terms of roll, pitch, and heading. The position of the camera may be expressed in terms of three-dimensional location. The three-dimensional location may include a latitude, a longitude, and an altitude.

In some embodiments, position estimation subsystem 116 may perform the following operations when generating the plurality of sets of image metadata. This process may be performed for every image within the image stream or for some images within the image stream. In some embodiments, position estimation subsystem 116 may select a first image and extrapolate, from a first image, known dimensions associated with the object based on the orientation of the object. For example, an object, such as a tank, may be oriented within an image such that the front of the object is facing the top left corner of the image. This way, the system may only determine the length of one or two sides of the object and may be the height of the object, depending on the angle of the image being captured. Accordingly, position estimation subsystem 116 may not determine all the dimensions of the object within the image.

To extrapolate the known dimensions associated with the object, position estimation subsystem 116 may match the correct dimensions based on the orientation of the object. In particular, position estimation subsystem 116 may determine a first object dimension of the known dimensions. For example, position estimation subsystem 116 may perform image analysis to determine the size of the first object dimension. The image analysis may involve color comparisons to determine where a particular dimension of the object begins and ends. For example, position estimation subsystem 116 may determine that the first object dimension is 3.12 inches (e.g., a length of a tank as shown in the image).

Position estimation subsystem 116 may then determine, based on the orientation of the object, a first real-world dimension that matches the first object dimension. For example, if the orientation of the object indicates that the object is facing the top left corner of the image, position estimation subsystem 116 may determine that the first object dimension corresponds to the real-world length of the object. Accordingly, position estimation subsystem 116 may assign a dimension label to the first object dimension. For example, position estimation subsystem 116 may assign a label of "length" to the first object dimension.

However, based on determining at least one dimension of the object and the real-world dimensions of the object, position estimation subsystem 116 may determine the other dimensions. In particular, position estimation subsystem 116 may determine a dimension modifier based on one or more known dimensions and the real-world dimensions. For example, position estimation subsystem 116 may determine a first dimension of the object within the image and match that dimension to the same dimension of the real-world object. Based on the ratio of the dimensions, position estimation subsystem 116 may determine a dimension modifier for the object (e.g., a ratio of the object within the image to the real-world object). For example, a tank may have a real-world length of twenty-six feet. Furthermore, on the image, the tank may have a length of 3.12 inches. Accordingly, the ratio or the dimension modifier may be 100-times (100×), which may be a ratio of the length of the image 3.12 inches and the real-world length of 26 feet (312 inches).

Thus, position estimation subsystem 116 may generate dimension values for unknown dimensions associated with the object based on the dimension modifier to generate the set of image dimensions of the object for the first image. For example, if the width of the real-world object is 12 feet (144 inches), the image width of the object may be 1.44 inches. Position estimation subsystem 116 may perform the same calculation on every dimension of the object to determine the full set of dimensions for the object.

Figure 4:
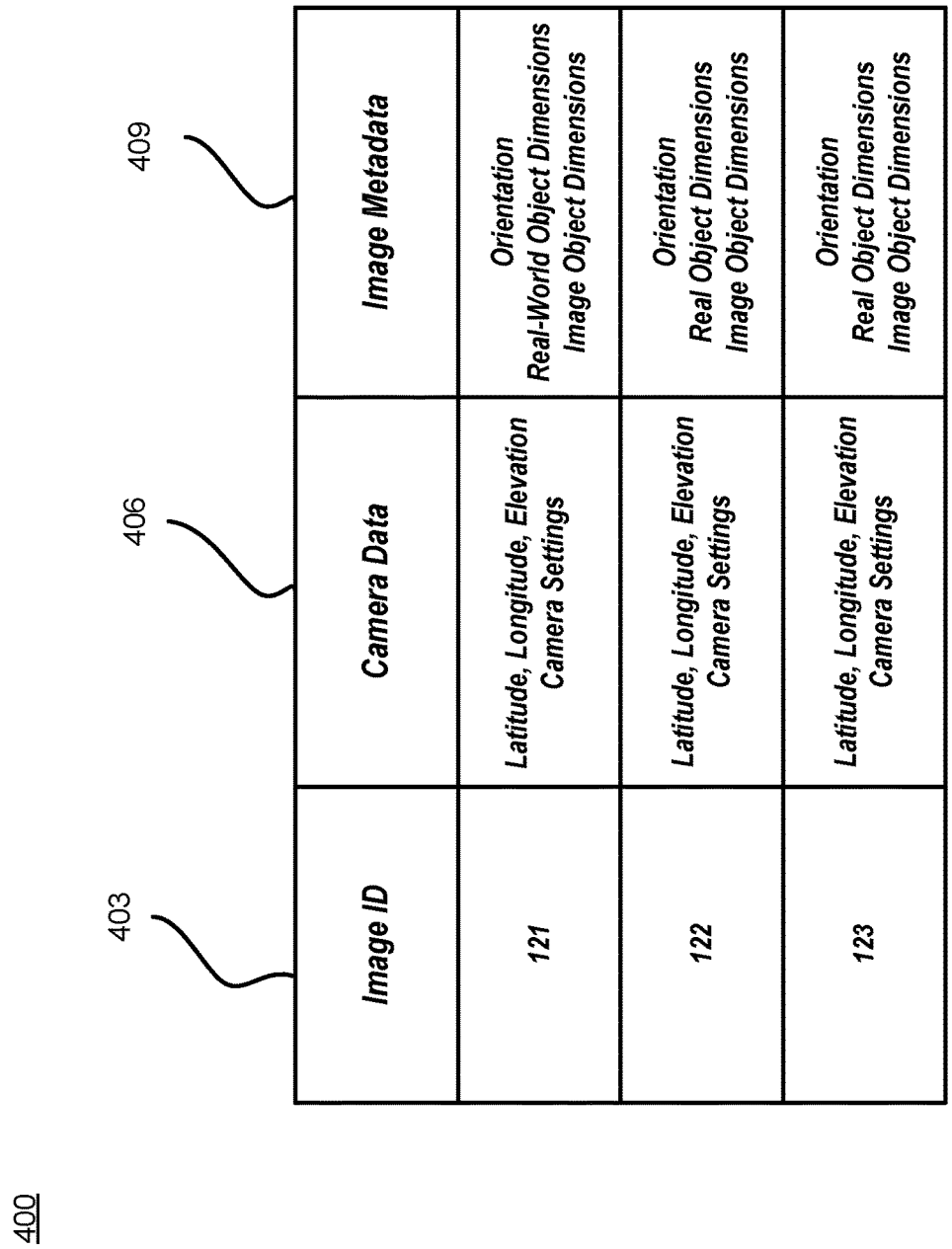
FIG. 4 illustrates an excerpt of a data structure that may image metadata for generation of three-dimensional location estimations, in accordance with one or more embodiments of this disclosure.

FIG. 4 illustrates an excerpt of a data structure that may image metadata for generation of three-dimensional location estimations. Field 403 may store an image identifier for each image used in the determination of the real-world location of the object. Field 406 may include object metadata. Object metadata may include attributes such as type of object (e.g., person, vehicle, etc.). For vehicles, object metadata may include the type of vehicle (e.g., air, ground, sea (underwater, above-water, etc.)). Field 406 may store camera data including, for example, the three-dimensional (e.g., real-world) location of the camera (e.g., the location of the unmanned vehicle upon which the camera is mounted), camera settings, and/or other suitable camera data. Camera settings may include things such as focal length, shutter speed, and/or other suitable camera settings. Field 409 may store image metadata including, for example, orientation of the object. In addition, field 409 may store real-world object dimensions (e.g., as retrieved from a database) and image object dimensions, as for example, determined above.

In some embodiments, position estimation subsystem 116 may determine the orientation of the object for one or more images in the data stream. In some instances, position estimation subsystem 116 may determine the orientation of the object for each image of the data stream. This may enable the estimations to be more accurate because the object may be moving (e.g., rotating or otherwise maneuvering) in such a way that the different orientation may affect the measurements. Furthermore, the movement of the vehicle (e.g., unmanned vehicle) may change the position of that vehicle enough that the orientation of the object may change in relation to the vehicle, thereby making estimations less accurate. Accordingly, position estimation subsystem 116 may input a first image of the plurality of images into a machine learning model (e.g., a machine learning model described above). In some embodiments, there may be a single machine learning model that outputs both the orientation of the object and the object identifier with the image. However, in some embodiments, there may be multiple machine learning models performing these tasks. Position estimation subsystem 116 may receive, from the machine learning model the object identifier and an updated orientation of the object. For example, the machine learning model may output a set of identifiers for one or more objects detected within the image as well as their orientations. Position estimation subsystem 116 may determine, based on the object identifier, the object that is being estimated (e.g., as discussed above) and store the orientation for that object. Position estimation subsystem 116 may then add the updated orientation to a corresponding set of the plurality of sets of image metadata. For example, if the updated orientation is for image 121 as shown in FIG. 4 field 403, position estimation subsystem 116 may add the new orientation into a corresponding field 409.

When the image metadata is generated, position estimation subsystem 116 may determine a plurality of estimations for a three-dimensional location of the object such that each estimation is based on a corresponding image. In some embodiments, the estimations may be generated on the fly, for example, as each image is received and a set of image metadata for that image is generated. However, in some embodiments, the estimations may not be generated until a number of images have associated image metadata generated (e.g., 3 images, 5 images, 10 images, etc.). Thus, image processing subsystem 116 may determine a plurality of position estimations of the object within the three-dimensional space, such that each position estimation of the plurality of position estimations is generated for a corresponding image of the plurality of images based on a corresponding set of image metadata. In some embodiments, position estimation subsystem 116 may use the focal length of the camera the real-world dimensions of the object, image dimensions, object dimensions, and sensor dimensions to estimate distance from the camera to the object in each image. Once each distance to object is generated, image processing subsystem 116 may use the location of the camera (e.g., as generated via GPS or another suitable method) to determine a three-dimensional estimate of the object within each image.

In some embodiments, position estimation subsystem 116 may add the estimations to a data structure of FIG. 4. For example, position estimation subsystem 116 may add another field (not shown) and put the position estimation for the particular image into the field. When the position estimations are generated, position estimation subsystem 116 may determine a location of the object within the three-dimensional space based on the plurality of position estimations. For example, position estimation subsystem 116 may execute a function against one or more position estimations to determine the location of the object within the three-dimensional system. The function may be, an average function, a mean function, a mode function or another suitable function.

In some embodiments, each position estimation may be a combination of a longitude coordinate and a latitude coordinate of the location of the object. In addition, each position estimation may include an altitude (e.g., for aerial objects). Thus, position estimation subsystem 116 may retrieve from the plurality of position estimations a plurality of latitude coordinates and a plurality of longitude coordinates. For example, position estimation subsystem 116 may access a data structure of FIG. 4 and retrieve the plurality of latitude coordinates and the plurality of longitude coordinates. In some embodiments, the position estimation subsystem 116 may also use elevation or altitude to identify the object in three-dimensional space. For example, the object may be a hover craft or another aerial vehicle. Thus, position estimation subsystem 116 may also determine the elevation of the object (e.g., above a position on the ground). The elevation or the estimates for elevation may be determined in the same manner as the estimations for the longitude and the latitude coordinates.

Position estimation subsystem 116 may then generate the location of the object within the three-dimensional space based on an average latitude coordinate and an average longitude coordinate. For example, position estimation subsystem 116 may calculate an average longitude and an average latitude for the coordinates within the images and use the average coordinate as the three-dimensional location of the object. In some embodiments, position estimation subsystem 116 may perform the averaging operation for the elevation coordinates for the estimations within the images. Thus, the three-dimensional location of the object may be a latitude of the object, a longitude of the object, and the elevation (e.g., altitude) of the object.

In some embodiments, position estimation subsystem 116 may determine whether the position estimations converge of time and if so, generate the three-dimensional location based on the convergence. In particular, position estimation subsystem 116 may sort the plurality of position estimations based on corresponding timestamps. For example, each image may have a corresponding timestamp. Accordingly, each position estimation may be associated with the timestamp of the corresponding image. Position estimation subsystem 116 may sort the position estimations based on those timestamps with the earlier timestamps being earlier in the sort.

Position estimation subsystem 116 may then determine whether the plurality of position estimations converge to a given value over time. For example, position estimation subsystem 116 may determine that the position estimates get closer to a particular location (e.g., latitude, longitude, and/or elevation) as they are determined over time. If that's the case, position estimation subsystem 116 may record the location as the three-dimensional location of the object.

However, if the position estimations do not converge over time, position estimation subsystem 116 may cause the camera to record more images. In particular, based on determining that the plurality of position estimations do not converge to the given value of time, position estimation subsystem 116 may generate a first command to the camera to record more images and a second command to the unmanned vehicle to perform more maneuvers. Position estimation subsystem 116 may repeat the process until convergence is determined.

In some instances, image processing system 102 may detect an object that it is unable to identify. For example, the object may be a particular building, a vehicle, or another suitable object that is not recognize by the machine learning model. Image processing system 102 may perform the location operation for those objects as well. In particular, image processing system 102 may identify a second object within the target location. For example, the machine learning model may identify that another object has been detected within the location. Although the object may be a building, the machine learning model may not be able to identify the type of object. Accordingly, image processing system 102 may determine that the second object does not have corresponding known dimensions.

In some embodiments, based on determining that the second object does not have the corresponding known dimensions, image processing system 102 may (e.g., via object detection subsystem 114) compare first image dimensions of the object and second image dimensions of the second object. For example, if the first object within the location has been recognized as a tank and the second object within the location has not been recognized, image processing system 102 may use the known dimensions of the recognized object and the ratio of object sizes within the image to determine dimensions of the unrecognized object. Accordingly, image processing system 102 may (e.g., via object detection subsystem 114) compare the dimensions of the two objects. Those comparisons may be based on the dimensions of the objects within the image. For example, the width of the known object may be one inch, while the width of the unknown object may be ten inches.

Based on comparing the first image dimensions and the second image dimensions, image processing system 102 may (e.g., via object detection subsystem 114) determine a second dimension modifier of the second object. For example, if the width of the first object is one inch and the width of the second object is ten inches, the second dimension modifier may be times ten. Accordingly, image processing system 102 may determine a second three-dimensional location of the second object based on the second dimension modifier. When the second object modifier is determined, image processing system 102 may combine the first dimension modifier and the second dimension modifier to arrive at the real-world size of the object. For example, if the real-world width of the original object (e.g., a tank) is seven feet and the image width is one inch, image processing system 102 may determine that the second object (e.g., the unrecognized building) being ten inches on the image is ten times larger in the real-world. Thus, the width of the unrecognized building may be seventy feet.

In some embodiments, image processing system 102 may determine that the object of interest is moving. Because it is difficult to calculate distance to a moving object while the point of observation is also moving, image processing system 102 may instruct the vehicle hosting the camera to stop moving. In particular, image processing system 102 may determine that the object is moving. Image processing system may use any available means to make the determination. In some embodiments, image processing system may use the images recorded by the camera to determine that the object is showing as larger (moving closer) or smaller (moving away) within the images taken over time to determine whether the object is moving.

Based on determining that the object is moving, image processing system 102 may generate a first command to the unmanned vehicle to stop maneuvering. For example, if the vehicle is moving away or toward the object, image processing system 102 may instruct the vehicle to stop. Image processing system 102 may then generate a second command to the camera to record more images. Once the new images are generated, image processing system 102 may repeat the process discussed above to generate position estimations and then a location of the object. Because the object is moving, image processing system 102 may adjust the calculations based on the movement of the object. Thus, image processing system 102 may update the location of the object over time based on the movement of the object.

In some embodiments, other vehicles (e.g., unmanned vehicles) may be within communication distance of the vehicle hosting the camera. Image processing system 102 may use recording devices (e.g., cameras) and processors on those vehicles to aid in the calculation of the three-dimensional location of the object. For example, recording devices 108a-108n may be used in these embodiments. In particular, image processing system 102 may detect a set of unmanned vehicles able to record images of the target location. The set of unmanned vehicles may include one or more vehicles. In some embodiments, image processing system 102 may detect manned or unmanned vehicles that support communication with image processing system 102 and are able to calculate estimations.

Image processing system 102 may transmit a command to the set of unmanned vehicles to establish a point-to-point communication. For example, there may not be any available network connection (e.g., cellular or satellite connection) in the vicinity of the unmanned vehicle. Thus, the unmanned vehicle may establish one or more point-to-point communications with another unmanned vehicle. In some embodiments, any of these vehicles may be manned vehicles or unmanned vehicles. The point-to-point communication may be over a known protocol, for example, Bluetooth, Wi-Fi, Wi-Max, and/or another suitable protocol.

Image processing system 102 may receive additional images of the target location and additional image metadata from the set of unmanned vehicles, and may use the additional images and the additional image metadata to determine additional object location estimates. For example, each vehicle in the set of the unmanned (or manned) vehicles may transmit images to image processing system 102. The images may include image metadata (e.g., as shown in FIG. 4). In some embodiments, each vehicle in the set may transmit a data structure of FIG. 4 to image processing system 102. In some embodiments, image processing system 102 may instruct each unmanned vehicle to use the corresponding images recorded by cameras on those vehicles to perform the location estimations and send those estimations to image processing system 102. When image processing system 102 receives those estimations, image processing system 102 may calculate the three-dimensional location of the object.

When the three-dimensional location of the object is calculated, image processing system 102 may use output subsystem 118 to transmit the three-dimensional location to one or more other devices. Output subsystem 118 may include software components, hardware components, or a combination of both. For example, output subsystem 118 may include software components that access data in memory and/or storage and may use one or more processors to generate overlays on top of images. Output subsystem 118 may generate an indicator at the three-dimensional location of each object within the image. The indicator may include the identifier of the object and/or other information related to the object. In some embodiments, the indicator may be an augmented reality indicator. For example, an operator may be wearing an augmented reality device (e.g., augmented reality glasses). The augmented reality device may be receiving the images (e.g., drone footage) and may be displaying that footage to the operator's augment reality device. Together with the drone footage, output subsystem 118 may display an augmented reality indicator overlayed over the drone footage.

In some embodiments, output subsystem 118 may select different indicators based on object types. For example, output subsystem 118 may determine, based on the metadata associated with the known object, a type associated with the object. That type may be an operator, land vehicle, a water vehicle, an aerial vehicle, or another suitable type. Output subsystem 118 may retrieve an augmented reality identifier associated with the type. For example, each type of object may have a different associated indicator. For an operator, an indicator may include an outline of a human, while each vehicle may include a unique outline associated with that particular vehicle. Output subsystem 118 may then generate for display the augmented reality identifier associated with the type at the location of the object within the image.

Computing Environment

Figure 5:
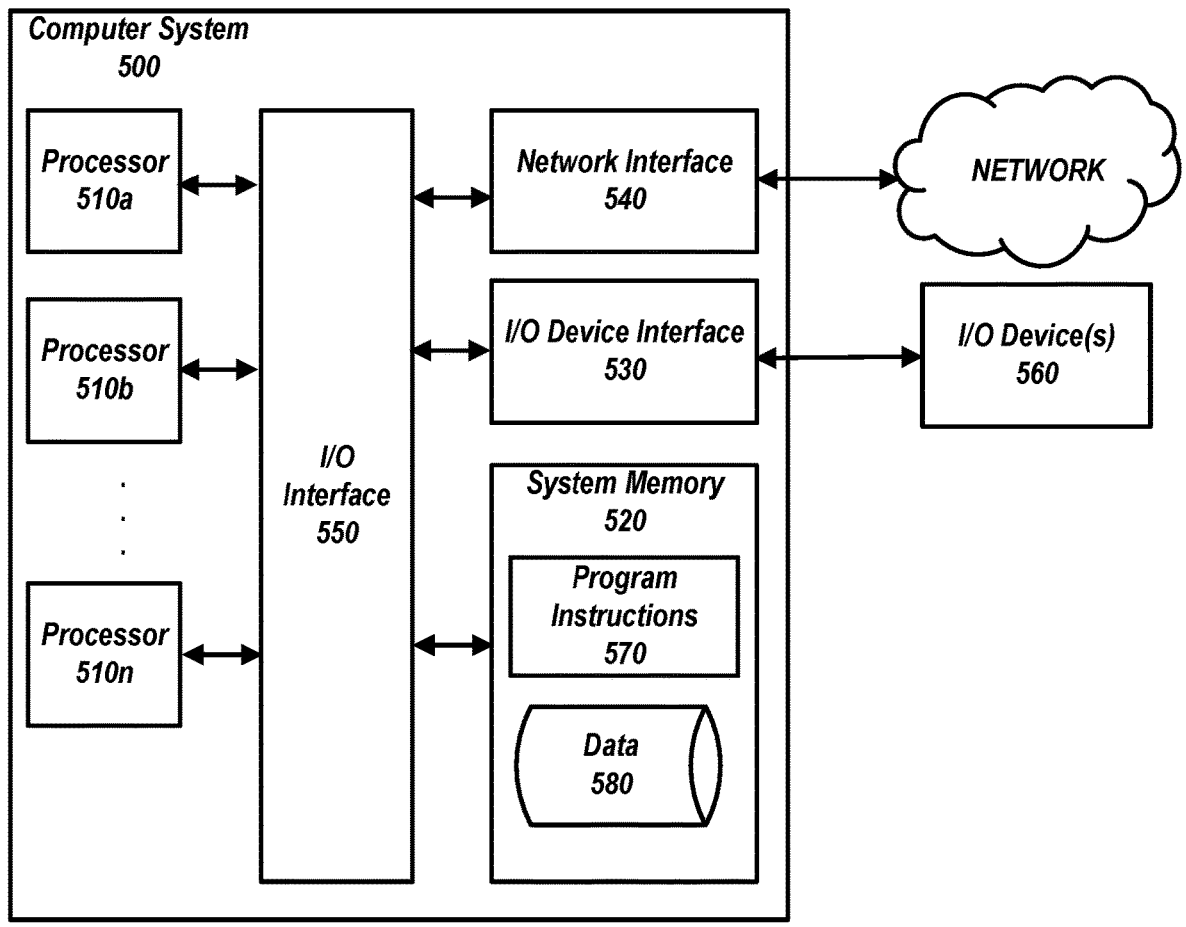
FIG. 5 illustrates a computing device, in accordance with one or more embodiments of this disclosure.

FIG. 5 shows an example computing system that may be used in accordance with some embodiments of this disclosure. In some instances, computing system 500 is referred to as a computer system. The computing system may be hosted on a device (e.g., a smartphone, a tablet, or another suitable device) that an operator may control. In some embodiments, the computing system may be hosted on a server at a datacenter. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 610a-610n) coupled to system memory 520, an input/output (I/O) device interface 530, and a network interface 540 via an I/O interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 610a-610n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random-access memory (RAM), static random-access memory (SRAM), synchronous dynamic RAM (SDRAM)), bulk storage memory (e.g., CD-ROM and/or DVD-ROM, hard drives), or the like. System memory 520 may include a non-transitory computer readable storage medium that may have program instructions stored thereon that are executable by a computer processor (e.g., one or more of processors 610a-610n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 610a-610n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 610a-610n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500, or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative, and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 6:
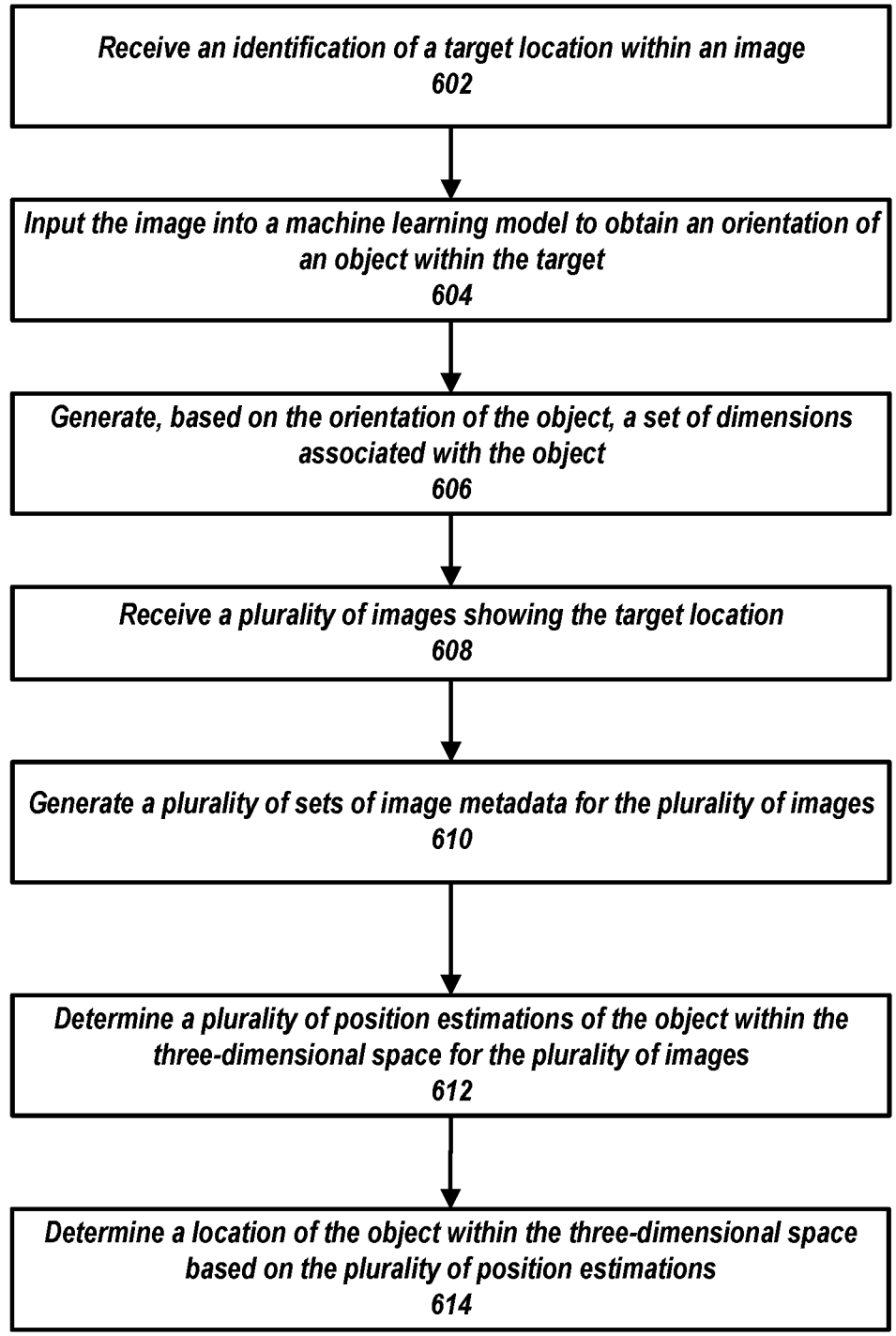
FIG. 6 is a flowchart of operations for identifying three-dimensional locations of objects within a video stream and linking those objects with known objects, in accordance with one or more embodiments of this disclosure.

FIG. 6 is a flowchart 600 of operations for generating composite frames of objects detected in multiple different types of data streams. The operations of FIG. 6 may use components described in relation to FIG. 5. In some embodiments, image processing system 102 may include one or more components of computing system 500. At 602, image processing system 102 receives identification of a target location within an image. For example, the image processing system may receive the identification from an operator or a command-and-control center. Image processing system 102 may receive the identification over network 150 using network interface 540. In some embodiments, image processing system 102 may receive the identification from data node 104.

At 604, image processing system 102 inputs the image into a machine learning model to obtain an orientation of an object within the target. For example, image processing system 102 may use one or more processors 510a, 510b, and/or 510n to perform the input. At 606, image processing system 102 generates, based on the orientation of the object, a set of dimensions associated with the object. For example, image processing system 102 may use one or more processors 510a-510n to perform this operation and may store the set of dimensions in system memory 520.

At 608, image processing system 102 receives a plurality of images showing the target location. Image processing system 102 may receive the images over a wired or wireless connection between the recording device (e.g., a camera) and the hardware hosting the image processing system. At 610, image processing system 102 generates a plurality of sets of image metadata for the plurality of images. Each image may include a corresponding position of the camera within three-dimensional space at a time when each image was recorded. Image processing system 102 may use one or more processors 510a. 510b, and/or 510n and/or system memory 520 to perform this operation.

At 612, image processing system 102 determines a plurality of position estimations of the object within the three-dimensional space for the plurality of images. Image processing system 102 may perform this operation using one or more processors 510a, 510b, and/or 510n and store the position estimations in system memory 520. At 614, image processing system 102 determines a location of the object within the three-dimensional space based on the plurality of position estimations. Image processing system 102 may perform this operation using one or more processors 510a, 510b, and/or 510n and store the position estimations in system memory 520.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving an identification of a target location within an image; inputting the image into a machine learning model to obtain an orientation of an object within the target location, wherein the machine learning model is trained to detect objects within received images; generating, based on the orientation of the object, a set of real-world dimensions associated with the object; receiving, from a recording device mounted on an unmanned vehicle, a plurality of images with each image of the plurality of images showing the target location; generating a plurality of sets of image metadata for the plurality of images, wherein each set of image metadata comprises a corresponding position of the camera within three-dimensional space at a time when each image was recorded; determining a plurality of position estimations of the object within the three-dimensional space, wherein each position estimation of the plurality of position estimations is generated for a corresponding image of the plurality of images based on the set of real-world dimensions a corresponding set of metadata; and determining a location of the object within the three-dimensional space based on the plurality of position estimations.

2. Any of the preceding embodiments, wherein determining the location of the object within the three-dimensional space based on the plurality of position estimations further comprises: retrieving from the plurality of position estimations a plurality of latitude coordinates, a plurality of elevations, and a plurality of longitude coordinates; and generating, the location of the object within the three-dimensional space based on an average latitude coordinate, an average elevation and an average longitude coordinate.

3. Any of the preceding embodiments, wherein for generating the plurality of sets of the image metadata further comprises: extrapolating, from a first image, known dimensions associated with the object based on the orientation of the object; determining a dimension modifier based on one or more known dimensions and the set of real-world dimensions; and generating dimension values for unknown dimensions associated with the object based on the dimension modifier to generate the image dimensions of the object for the first image.

4. Any of the preceding embodiments, further comprising: determining that the orientation of the object has changed; based on determining that the orientation of the object has changed, updating the dimension modifier; and updating the known dimensions associated with the object to generate an updated set of dimensions.

5. Any of the preceding embodiments, wherein determining that the orientation of the object has changed further comprises: inputting a first image of the plurality of images into the machine learning model; receiving, from the machine learning model, an updated orientation of the object; and determining that the orientation and the updated orientation do not match.

6. Any of the preceding embodiments, further comprising: identifying a second object within the target location; determining that the second object does not have corresponding known dimensions; based on determining that the second object does not have the corresponding known dimensions, comparing first image dimensions of the object and second image dimensions of the second object; based on comparing the first image dimensions and the second image dimensions, determining a second dimension modifier of the second object; and determining a second three-dimensional location of the second object based on the second dimension modifier.

7. Any of the preceding embodiments, wherein determining the location of the object within the three-dimensional space based on the plurality of position estimations further comprises: sorting the plurality of position estimations based on corresponding timestamps; determining whether the plurality of position estimations converge to a given value over time; and based on determining that the plurality of position estimations do not converge to the given value of time, generating a first command to the recording device to record more images and a second command to the unmanned vehicle to perform more maneuvers.

8. Any of the preceding embodiments, further comprising: determining that the object is moving; based on determining that the object is moving, generating a first command to the unmanned vehicle to stop maneuvering; generating a second command to the recording device to record more images; and adjusting the location of the object based on movement of the object.

9. Any of the preceding embodiments, wherein further comprising: detecting a set of unmanned vehicles able to record images of the target location; transmitting a command to the set of unmanned vehicles to establish a point-to-point communication; receiving additional images of the target location and additional image metadata from the set of unmanned vehicles; and using the additional images and the additional image metadata to determine additional object location estimates.

10. A tangible, non-transitory, machine-readable medium storing instructions that, when executed by a data processing apparatus, cause the data processing apparatus to perform operations comprising those of any of embodiments 1-9.

11. A system comprising: one or more processors; and memory storing instructions that, when executed by the processors, cause the processors to effectuate operations comprising those of any of embodiments 1-9.

12. A system comprising means for performing any of embodiments 1-9.

13. A system comprising cloud-based circuitry for performing any of embodiments 1-9.

What is claimed is:

1. A system for estimating object location within three-dimensional space object locations and orientations within images, the system comprising:
   one or more processors; and
   a non-transitory, computer-readable storage medium storing instructions, which when executed by the one or more processors cause the one or more processors to perform operations comprising:
   receiving, at an unmanned vehicle, an identification of a target location within an image recorded by the unmanned vehicle;
   inputting the image into a machine learning model to obtain an object identifier and an orientation of an object within the target location, wherein the machine learning model is trained to detect objects within received images;
   determining, based on the object identifier, a set of real-world dimensions associated with the object;
   receiving, from a camera mounted on the unmanned vehicle, an image stream comprising a plurality of images with each image of the plurality of images showing the target location, wherein the image stream is recorded by the camera as the unmanned vehicle moves in relation to the object;
   generating a plurality of sets of image metadata for the plurality of images, wherein each set of image metadata comprises, the orientation of the object, image dimensions of the object, camera data associated with the camera, an orientation of the camera and a position of the camera within three-dimensional space at a time when each image was recorded;
   determining a plurality of position estimations of the object within the three-dimensional space, wherein each position estimation of the plurality of position estimations is generated for a corresponding image of the plurality of images based on a corresponding set of image metadata; and
   determining a location of the object within the three-dimensional space based on the plurality of position estimations.

2. The system of claim 1, wherein the instructions for determining the position of the object within the three-dimensional space based on the plurality of position estimations further cause the one or more processors to perform operations comprising:
   retrieving from the plurality of position estimations a plurality of latitude coordinates, a plurality of elevations, and a plurality of longitude coordinates; and
   generating, the location of the object within the three-dimensional space based on an average latitude coordinate, an average elevation, and an average longitude coordinate.

3. The system of claim 1, wherein the instructions, for generating the plurality of sets of the image metadata further cause the one or more processors to perform operations comprising:
   extrapolating, from a first image, known dimensions associated with the object based on the orientation of the object;
   determining a dimension modifier based on one or more known dimensions and the set of real-world dimensions; and
   generating dimension values for unknown dimensions associated with the object based on the dimension modifier to generate the image dimensions of the object for the first image.

4. The system of claim 3, wherein the instructions for extrapolating, from the first image, the known dimensions associated with the object further cause the one or more processors to perform operations comprising:
   determining a first object dimension of the known dimensions;
   determining, based on the orientation of the object, a first real-world dimension that matches the first object dimension; and
   assigning a dimension label to the first object dimension.

5. The system of claim 1, wherein the instructions for generating the plurality of sets of the image metadata further cause the one or more processors to perform operations comprising:
   inputting a first image of the plurality of images into the machine learning model;
   receiving, from the machine learning model the object identifier and an updated orientation of the object; and
   adding the updated orientation to a corresponding set of the plurality of sets of the image metadata.

6. The system of claim 1, wherein the instructions further cause the one or more processors to perform operations comprising:

identifying a second object within the target location;
determining that the second object does not have corresponding known dimensions;
based on determining that the second object does not have the corresponding known dimensions, comparing first image dimensions of the object and second image dimensions of the second object the second object;
based on comparing the first image dimensions and the second image dimensions, determining a second dimension modifier of the second object; and
determining a second three-dimensional location of the second object based on the second dimension modifier.

7. The system of claim 1, wherein the instructions for determining the location of the object within the three-dimensional space based on the plurality of position estimations further cause the one or more processors to perform operations comprising:
sorting the plurality of position estimations based on corresponding timestamps;
determining whether the plurality of position estimations converge to a given value over time; and
based on determining that the plurality of position estimations do not converge to the given value of time, generating a first command to the camera to record more images and a second command to the unmanned vehicle to perform more maneuvers.

8. The system of claim 1, wherein the instructions further cause the one or more processors to perform operations comprising:
determining that the object is moving;
based on determining that the object is moving, generating a first command to the unmanned vehicle to stop maneuvering;
generating a second command to the camera to record more images; and
adjusting the location of the object based on movement of the object.

9. The system of claim 1, wherein the instructions further cause the one or more processors to perform operations comprising:
detecting a set of unmanned vehicles able to record one or more images of the target location;
transmitting a command to the set of unmanned vehicles to establish a point-to-point communication;
receiving additional images of the target location and additional image metadata from the set of unmanned vehicles; and
using the additional images and the additional image metadata to determine additional object location estimates.

10. A method comprising:
receiving, at an unmanned vehicle, an identification of a target location within an image recorded by the unmanned vehicle;
inputting the image into a machine learning model to obtain an object identifier and an orientation of an object within the target location, wherein the machine learning model is trained to detect objects within received images;
determining, based on the object identifier, a set of real-world dimensions associated with the object;
receiving, from a recording device mounted on the unmanned vehicle, a plurality of images with each image of the plurality of images showing the target location;
generating a plurality of sets of image metadata for the plurality of images, wherein each set of image metadata comprises, the orientation of the object, image dimensions of the object, an orientation of a camera and a position of the camera within three-dimensional space at a time when each image was recorded;
determining a plurality of position estimations of the object within the three-dimensional space, wherein each position estimation of the plurality of position estimations is generated for a corresponding image of the plurality of images based on a corresponding set of image metadata; and
determining a location of the object within the three-dimensional space based on the plurality of position estimations.

11. The method of claim 10, wherein determining the location of the object within the three-dimensional space based on the plurality of position estimations further comprises:
retrieving from the plurality of position estimations a plurality of latitude coordinates and a plurality of longitude coordinates; and
generating, the location of the object within the three-dimensional space based on an average latitude coordinate and an average longitude coordinate.

12. The method of claim 10, wherein for generating the plurality of sets of the image metadata further comprises:
extrapolating, from a first image, known dimensions associated with the object based on the orientation of the object;
determining a dimension modifier based on one or more known dimensions and the set of real-world dimensions; and
generating dimension values for unknown dimensions associated with the object based on the dimension modifier to generate the image dimensions of the object for the first image.

13. The method of claim 12, further comprising:
determining that the orientation of the object has changed;
based on determining that the orientation of the object has changed, updating the dimension modifier; and
updating the known dimensions associated with the object to generate an updated set of dimensions.

14. The method of claim 10, wherein determining that the orientation of the object has changed further comprises:
inputting a first image of the plurality of images into the machine learning model;
receiving, from the machine learning model, an updated orientation of the object; and
determining that the orientation and the updated orientation do not match.

15. The method of claim 10, further comprising:
identifying a second object within the target location;
determining that the second object does not have corresponding known dimensions;
based on determining that the second object does not have the corresponding known dimensions, comparing first image dimensions of the object and second image dimensions of the second object the second object;
based on comparing the first image dimensions and the second image dimensions, determining a second dimension modifier of the second object; and
determining a second three-dimensional location of the second object based on the second dimension modifier.

16. The method of claim 10, wherein determining the location of the object within the three-dimensional space based on the plurality of position estimations further comprises:

sorting the plurality of position estimations based on corresponding timestamps;

determining whether the plurality of position estimations converge to a given value over time; and based on determining that the plurality of position estimations do not converge to the given value of time, generating a first command to the recording device to record more images and a second command to the unmanned vehicle to perform more maneuvers.

17. The method of claim 10, further comprising:

determining that the object is moving;

based on determining that the object is moving generating a first command to the unmanned vehicle to stop maneuvering;

generating a second command to the recording device to record more images; and adjusting the location of the object based on movement of the object.

18. The method of claim 10, wherein further comprising:

detecting a set of unmanned vehicles able to record images of the target location;

transmitting a command to the set of unmanned vehicles to establish a point-to-point communication;

receiving additional images of the target location and additional image metadata from the set of unmanned vehicles; and using the additional images and the additional image metadata to determine additional object location estimates.

19. A non-transitory, computer-readable medium comprising instructions, that when executed by one or more processors, cause the one or more processors to perform operations comprising:

receiving an identification of a target location within an image;

inputting the image into a machine learning model to obtain an object identifier and an orientation of an object within the target location, wherein the machine learning model is trained to detect objects within received images;

generating, based on the object identifier and the orientation of the object, a set of real-world dimensions associated with the object;

receiving, from a recording device, a plurality of images with each image of the plurality of images showing the target location;

generating a plurality of sets of image metadata for the plurality of images, wherein each set of image metadata comprises a position of the recording device within three-dimensional space at a time when each image was recorded;

determining a plurality of position estimations of the object within the three-dimensional space, wherein each position estimation of the plurality of position estimations is generated for a corresponding image of the plurality of images, based on the set of real-world dimensions, a corresponding location of the object within the corresponding image and a corresponding position of the recording device; and determining a location of the object within the three-dimensional space based on the plurality of position estimations.

20. The non-transitory, computer-readable medium of claim 19, wherein the instructions further cause the one or more processors to perform operations comprising:

detecting a set of unmanned vehicles able to record images of the target location;

transmitting a command to the set of unmanned vehicles to establish a point-to-point communication;

receiving additional images of the target location and additional image metadata from the set of unmanned vehicles; and using the additional images and the additional image metadata to determine additional object location estimates.

* * * * *